Sept. 5, 1939.  J. M. OLDHAM  2,171,668
VALVE SPRING RETAINER
Filed Feb. 21, 1938
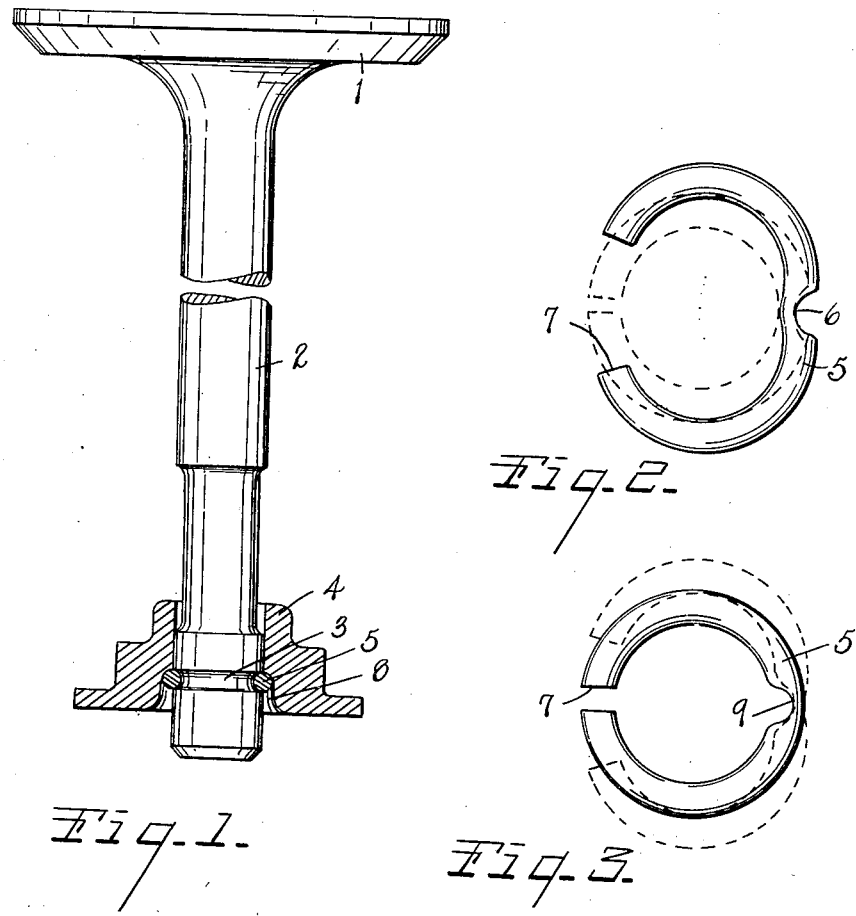

UNITED STATES PATENT OFFICE 2,171,668

VALVE SPRING RETAINER

John M. Oldham, Pleasant Ridge, Mich., assignor to Leonard A. Young, Detroit, Mich.

Application February 21, 1938, Serial No. 191,766

1 Claim. (Cl. 251—144)

This invention relates to improvements in valve spring retainers.

The main objects of this invention are:

First, to provide a valve spring retainer for valves such as poppet valves of internal combustion engines which is very economical in structure and at the same time easily applied and removed, and also effective in retaining the parts in working relation.

Second, to provide a valve spring retainer which may be produced with great uniformity whereby the assembled parts are always in the intended relation.

Further objects and objects pertaining to details and economies of the invention will definitely appear from the description to follow. The invention is defined in the claim.

A structure which embodies the features of my invention is clearly illustrated in the accompanying drawing in which:

Fig. 1 is a fragmentary side elevation of a valve with valve spring seat member and thrust ring in vertical section.

Fig. 2 is a plan view of a valve spring seat retainer ring embodying my invention, the closed position of the ring being indicated by dotted lines.

Fig. 3 is a plan view of a slightly modified form or embodiment of my invention with the ring shown in opened position by dotted lines.

In the accompanying drawing 1 represents a valve such as the poppet valve of an internal combustion engine which is provided with a stem 2 having an annular groove 3 therein. The valve spring seat member 4 is suitably designed to support a spring which is not illustrated as the relation of the spring to valves of this type is well understood in the art.

To detachably retain the valve spring seat member 4 in assembled relation with the stem I provide a thrust member 5 which in the embodiment shown in Figs. 1, 2 and 3 is of round cross sectional shape to fit in the groove 3 of corresponding sectional shape. The ring 5 has a notch or recess 6 opposite its split 7, this notch or recess providing a hinge or flexing zone enabling the ring to be readily opened up as shown by dotted lines in Fig. 2 to facilitate its being slipped upon the stem and closed into the groove 3 thereof. The seat member 4 is sleeved upon the stem and is provided with an outwardly facing recess 8, the inner end of the recess being such that the walls of the recess closely embrace the thrust member when the parts are in assembled relation as shown in Fig. 1, clamping and retaining the ring in the groove. The ring 5 forms a firm seat for the valve spring seat member.

The walls of the recess 8 are preferably outwardly flared so that when the ring 5 is positioned in the groove and the seat member allowed to drop or move outwardly thereon, the ring is closed into the groove and firmly retained therein.

In the modification shown in Fig. 3 the hinge forming recess 9 is formed on the inner side of the ring.

In these embodiments the split thrust ring may be very economically produced and may be produced in large quantities very accurately in the matter of size. This is a matter of considerable advantage as it will be appreciated that it is desirable that the spring seat members be supported in exactly the intended relation; otherwise the tension on the several valves of an internal combustion engine may be objectionably varied. It will be understood that rings of the type shown in Figs. 2 and 3 are manufactured and delivered to the user with the ring in open position so that all the user has to do is to close the ring into the groove.

The structure is very easy to assemble and disassemble. The thrust ring when closed into the groove is retained therein while the other parts are being adjusted to position, and is securely locked therein when the spring seat member is adjusted to supported position.

I have illustrated and described certain very practical embodiments of my invention and it is believed such as will enable those skilled in the art to practice my invention as may be desired.

Having thus described my invention what I claim as new and desire to secure by Letters Patent is:

The combination with a valve stem having an annular groove therein, of a valve spring seat member sleeved upon said stem and having an outwardly opening annular recess therein, the walls of the recess being flared outwardly, and a split thrust ring engaged in said groove for retaining said valve spring member on said stem, said thrust ring having an integral hinge part opposite its split facilitating the opening and closing thereof, said thrust ring being conformed in cross section to the cross-sectional shape of the groove, the inner end of said recess in said seat member being of such diameter as to closely embrace said thrust ring and retain it in said groove when the seat member is in supporting engagement with the thrust ring, the inner end of the recess of said seat member being conformed to fit the outer surface of the thrust ring.

JOHN M. OLDHAM.